(12) United States Patent
Mueller-Schneiders et al.

(10) Patent No.: US 8,180,527 B2
(45) Date of Patent: May 15, 2012

(54) DRIVER ASSISTANCE METHOD

(75) Inventors: Stefan Mueller-Schneiders, Duesseldorf (DE); Sharmila Ghosh, Mainz (DE)

(73) Assignee: Delphi Technologies, Inc., Troy, MI (US)

( * ) Notice: Subject to any disclaimer, the term of this patent is extended or adjusted under 35 U.S.C. 154(b) by 825 days.

(21) Appl. No.: 12/287,177

(22) Filed: Oct. 7, 2008

(65) Prior Publication Data

US 2009/0093927 A1   Apr. 9, 2009

(30) Foreign Application Priority Data

Oct. 8, 2007   (EP) .................................... 07019636

(51) Int. Cl.
*G06F 7/00* (2006.01)
(52) U.S. Cl. ................. 701/36; 701/37; 701/38; 701/82
(58) Field of Classification Search .................... 701/25, 701/26, 36, 37, 38, 82
See application file for complete search history.

(56) References Cited

U.S. PATENT DOCUMENTS

| | | | |
|---|---|---|---|
| 6,577,937 B1 | 6/2003 | Shuman et al. | |
| 2003/0191568 A1* | 10/2003 | Breed | 701/36 |
| 2008/0004761 A1* | 1/2008 | Yamada | 701/25 |
| 2008/0059054 A1* | 3/2008 | Yamada | 701/200 |
| 2008/0215202 A1* | 9/2008 | Breed | 701/25 |
| 2010/0211270 A1* | 8/2010 | Chin et al. | 701/44 |

FOREIGN PATENT DOCUMENTS

| | | |
|---|---|---|
| DE | 10341754 | 5/2005 |
| EP | 0819912 | 1/1998 |
| EP | 1104881 | 6/2001 |

OTHER PUBLICATIONS

Janssen H. et al.: "Vehicle surround sensing based on information fusion of monocular video and digital map" Jun. 14, 2004 Intelligent Vehicles Symposium, 2004 IEEE Parma, Italy Jun. 14-17, 2004, Piscataway, NJ, USA, IEEE, pp. 244-249, EPO10727476 ISBN: 0-7803-8310-9.
The Mar. 12, 2008, EP Search report.

* cited by examiner

*Primary Examiner* — Toan To
(74) *Attorney, Agent, or Firm* — Paul W. Thiede

(57) ABSTRACT

The invention relates to a method for the assistance of a driver of a vehicle during a journey along a road, in which bend data indicating the course of a bend in the road extending in front of the vehicle seen in the direction of travel and road condition data indicating the condition of the road surface disposed in front of the vehicle seen in the direction of travel are determined and a recommended maximum speed allowing a safe driving through the bend is determined with reference to the bend data and to the road condition data.

18 Claims, 2 Drawing Sheets

DRIVER ASSISTANCE METHOD

TECHNICAL FIELD

The invention relates to a method for the assistance of a driver of a vehicle during a journey along a road in which bend data setting forth the course of a bend in the road extending in front of the vehicle seen in the direction of travel in which a maximum speed allowing a safe travel through the bend is determined with reference to the bend data.

BACKGROUND OF THE INVENTION

Such a method is generally known and is used, for example in a driver assistance system to display a maximum speed resulting from the course of the bend to the driver of the vehicle at which the vehicle can drive through the bend safely and/or to warn the driver when the vehicle is approaching the bend at a speed or is driving into the bend at a speed at which a safe driving through of the bend is no longer ensured.

It is the underlying object of the invention to provide a driver assistance method by which the driving safety is increased even further.

SUMMARY OF THE INVENTION

In the method in accordance with the invention for the assistance of a driver of a vehicle during a journey along a road, not only bend data indicating the course of a bend in the road extending in front of the vehicle seen in the direction of travel is determined, but also road condition data are determined which indicate the condition of the road surface disposed in front of the vehicle seen in the direction of travel. A recommended maximum speed allowing a safe driving through the bend is determined by a fusion of the bend data and the road condition data.

In other words, it is the underlying general idea of the invention to determine the maximum speed recommended for a safe driving through of a bend not only with reference to the course of the bend, but, additionally to take account of the condition of the road surface extending in front of the vehicle seen in the direction of travel. It is hereby possible to downwardly adapt the maximum speed resulting purely from the course of the bend on the detection of a suboptimal road surface condition which can result in a lesser adhesion of the vehicle wheels to the road surface in order to display a recommended maximum speed to the driver of the vehicle which also still allows a safe driving through of the bend under adverse road conditions.

As a result, the invention therefore provides for the determination of a recommended maximum speed for a cornering which takes account of at least one additional relevant environmental parameter, namely the condition of the road surface, and is thus better adapted to the actual circumstances influencing the cornering. The determination of the maximum speed recommended for the cornering in accordance with the invention therefore contributes to being able to drive through the bend with a lower risk of an accident and thus provides higher driving safety overall.

In accordance with a preferred embodiment, the road condition data include information on the presence of wetness on the road. The adhesion of a vehicle on a wet road is typically much reduced with respect to the adhesion on a dry road. Since the degree of dryness or of moisture of the road surface is included in the determination of the recommended maximum speed, the determined recommended maximum speed will typically be lower for a wet road than for a dry road. In this way, the method does not only contribute to safer cornering on a dry road, but also on a wet road.

Alternatively or additionally, the road condition data can also include information on the quality of the road surface, for example information on the roughness and/or the type of the road surface or information on the presence of ice, snow, sand or oil on the road.

The road condition data are advantageously determined by the evaluation of at least one image taken with the help of a camera which detects an environmental zone of the vehicle disposed in front of the vehicle seen in the direction of travel.

The camera can be a component of a rain sensor provided for the control of a windshield wiper and/or it can be a camera of a driver assistance system used for lane recognition, for road sign recognition and/or for the determination of visibility conditions. A multifunctional use of the camera, i.e. that is a use of the camera not only for the determination of the road condition, but also for the control of a windshield wiper, for lane recognition, for road sign recognition and/or for the determination of visibility conditions provides a substantial cost advantage.

Not only the presence of wetness can be determined by a suitable evaluation of the image taken with the help of the camera, but the texture of the road surface can, for example, also be analyzed and a conclusion be drawn on the basis thereof on the presence of sand on the road or on a dust road or gravel road and this can be taken into account in the determination of the recommended maximum speed.

Alternatively or additionally, at least the presence of wetness on the road can also be determined by a different kind of rain sensor. A rain sensor can preferably also be considered for this purpose which is anyway present in the vehicle, such as a rain sensor which controls the actuation of a windshield wiper. The rain sensor is used in a multifunctional manner in this way, namely for the control of the windshield wiper, on the one hand, and for the determination of the maximum speed recommended for the cornering, on the other hand, whereby a specific cost advantage is also achieved here in addition to the increase in driving safety.

Furthermore, the road condition data can alternatively or additionally be received by an internet based service, a radio service such as TMC (for "traffic message channel"), a communications service between the vehicle and another vehicle and/or a communications service between the vehicle and an infrastructure which includes, for example, transmission devices installed along the road.

The road condition data received by the aforesaid services can be taken into account in the determination of the recommended maximum speed instead of or supplementary to the road condition data determined by the vehicle's own camera. A fusion of the road condition data determined by the vehicle's own camera and the road condition data received from external enables a determination of the actual road condition with increased reliability.

In accordance with a further embodiment, the bend data are determined from a digital map made available to the vehicle. Such a digital map is preferably the map of a navigation system installed in the vehicle. Deepening on the quality and in particular on the resolution of the map, it can be sufficient on the determination of the recommended maximum speed to determine the course of the bend to be driven through only with reference to the map.

Alternatively or additionally, the bend data can be determined by the evaluation of at least one image taken with the help of a camera which detects an environmental zone of the vehicle disposed in front of the vehicle seen in the direction of travel.

The camera can be the camera of a lane recognition module of a driver assistance system which can be used not only for the detection of the course of a vehicle lane, but rather multifunctionally, i.e. also additionally for the control of a windshield wiper, for the determination of road condition data, for the detection of road signs and/or for the determination of visibility conditions.

By a fusion of bend data determined from a digital map and of bend data gained from the camera images, the course of the bend to be driven through can be determined with increased precision, which ultimately contributes to even higher driving safety.

In accordance with a further embodiment, a road sign is detected by the evaluation of at least one image taken with the help of a camera which detects an environmental zone of the vehicle disposed in front of the vehicle seen in the direction of travel and the detected road sign is taken into account in the determination of the recommended maximum speed.

The camera used for the road sign recognition can also be a multifunctionally used camera, i.e. a camera which is used in addition to road sign recognition for the control of a windshield wiper, for lane recognition, for the determination of the road condition and/or for the determination of the visibility conditions, whereby the already mentioned cost advantage is achieved.

Applicable speed limits can be detected and taken into account in the determination of the recommended maximum speed by a corresponding evaluation of detected road signs for a section of the road and in particular for the bend to be driven through. If, for example, a speed limit of "80 kph" or of "80 kph when wet" applies to a road section with bends, the recommended maximum speed can accordingly be set to 80 kph even if the course of the road or bend and the road condition would theoretically allow a higher maximum speed.

In accordance with a further embodiment, the visibility conditions prevailing in an environmental zone of the vehicle disposed in front of the vehicle seen in the direction of travel are estimated by the evaluation of at least one image taken with the help of a camera which detects the environmental zone and the estimated visibility conditions are taken into account in the determination of the recommended maximum speed.

In this manner, for example, the recommended maximum speed can be reduced accordingly under particularly adverse visibility conditions, whereby ultimately even higher driving safety is achieved. The camera can also be a multifunctionally utilized camera here which is used, in addition to the determination of the visibility conditions, for example for the control of a windshield wiper, for lane recognition, for road sign detection and/or for the determination of the road condition, whereby the already mentioned cost advantage is achieved.

If the actual speed of the vehicle when approaching or driving into the bend is above the recommended maximum speed, a visual and/or acoustic warning signal can be output to the driver for example. Alternatively or additionally, the vehicle can be slowed down automatically if the actual speed of the vehicle when approaching or driving into the bend is above the recommended maximum speed.

A further subject of the invention is furthermore a driver assistance system for the assistance of a driver of a vehicle during a journey along a road comprising a first module for the determination of bend data indicating the course of a road bend extending in front of the vehicle seen in the direction of travel, a second module for the determination of road condition data indicating the condition of the road surface disposed in front of the vehicle seen in the direction of travel, and a processor module, connected to the first and second modules, for the determination of a recommended maximum speed allowing a safe driving through the bend with reference to the bend data and road condition data determined by the first and second modules.

The driver assistance system in accordance with the invention enables the carrying out of the method in accordance with the invention with all its advantages described above. The driver assistance system can include, additionally to the modules for the determination of bend data and road condition data, a rain sensor module, a lane recognition module, a road sign detection module, a visibility condition determination module and/or a module for the automatic actuation of a vehicle headlamp or it can be coupled to a navigation system of the vehicle.

The preceding modules preferably use a common camera, where present, which detects an environmental zone of the vehicle disposed in front of the vehicle seen in the direction of travel, whereby a particularly space saving and cost effective construction of the modules is achieved. It is, however, generally also possible to design at least one of the modules or all of these modules autonomously, i.e. that is to equip them with their own respective camera or another suitable detection means.

BRIEF DESCRIPTION OF THE DRAWINGS

The invention will be described in the following purely by way of example with reference to an advantageous embodiment and to the enclosed drawing.

DETAILED DESCRIPTION

Figure 1:
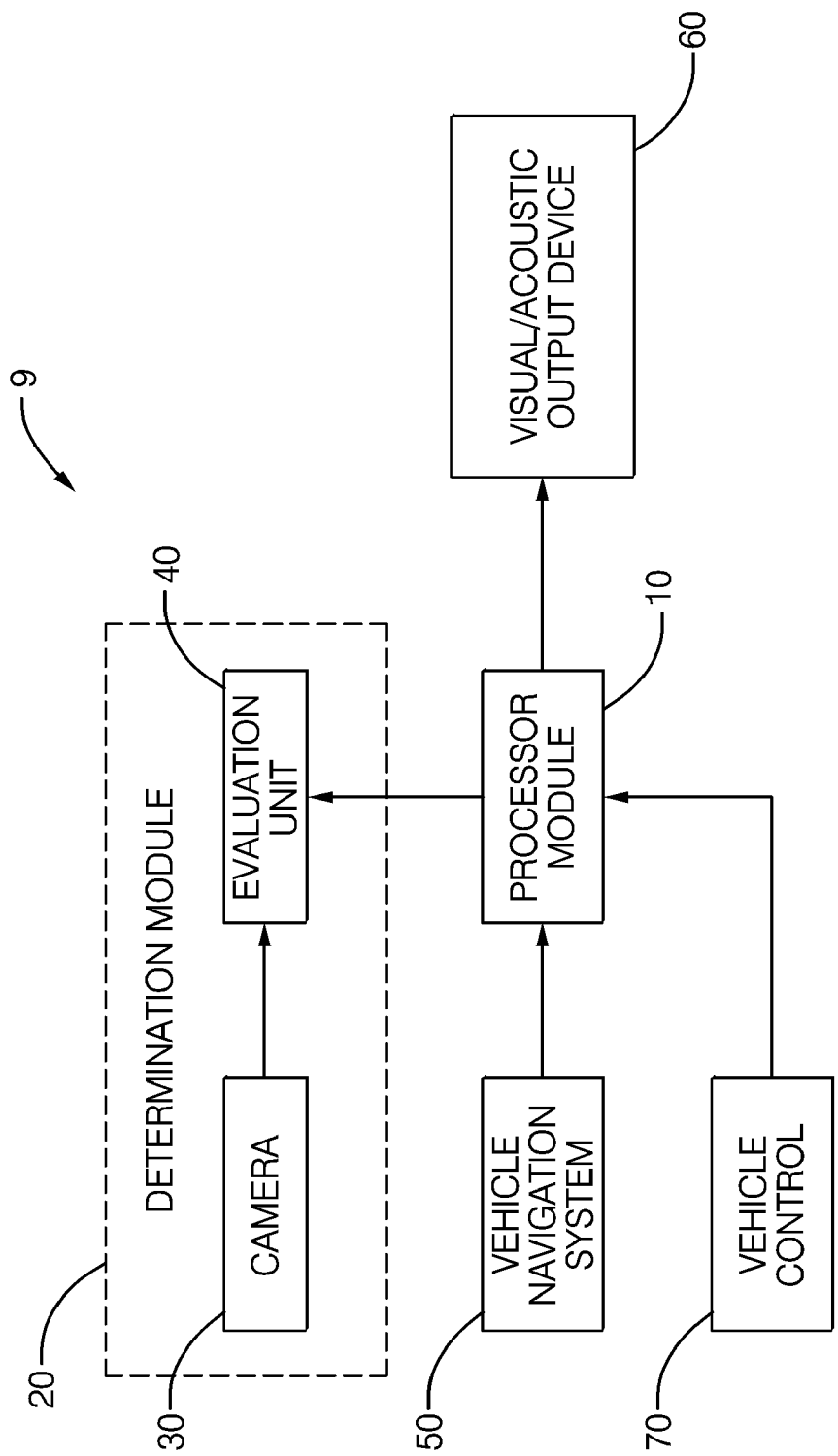
FIG. 1 shows a schematic representation of a driver assistance system of a vehicle in accordance with the invention.

The core of the driver assistance system 9 shown in FIG. 1 is a processor module 10. The processor module 10 is connected to a determination module 20 which includes a camera 30, for example a digital video camera, and an evaluation unit 40, connected to the camera 30, for the evaluation of the images taken by the camera 30.

The camera 30 is configured and is attached to the vehicle such that it detects an environmental zone of the vehicle disposed in front of the vehicle seen in the direction of travel and including a road extending in front of the vehicle. The camera 30 can, for example, be installed in the region of a rear view mirror provided in the region of the vehicle windshield.

An image evaluation algorithm implemented in the evaluation unit 40 is configured such that, by the evaluation of the images taken by the camera 30, wetness deposited on the windshield e.g. in the form of fog, rain or snow can be detected, on the one hand, and the course of the road extending in front of the vehicle seen in the direction of travel can be detected, on the other hand. Whereas the first operation is also called a rain sensor function, the latter operation is known as road lane recognition.

In addition, the evaluation unit 40 has the operation of road sign recognition, i.e. the evaluation unit 40 can detect road signs in the camera images and can detect their purpose or content.

The evaluation unit 40 additionally includes an image evaluation algorithm which allows information to be derived from the taken camera images on the visibility conditions prevailing in the environmental zone detected by the camera 30 and to determine, for example, whether it is day or night or whether it is foggy.

The evaluation unit 40 furthermore provides an image evaluation algorithm which analyzes the texture of the surface of the road disposed in front of the vehicle to detect whether the road is, for example, an asphalted road or a dust road or a gravel road or whether e.g. an asphalted road is regionally covered by a layer of sand, snow or ice.

The processor module 10 is further coupled with a vehicle navigation system 50 in which a digital map is stored. The navigation system can determine the then current position of the vehicle on the digital map with the aid of the global positioning system GPS at any time.

During the journey, the navigation system 50 delivers information to the processor module 10 on the course of the road on which the vehicle is moving and in particular information on the course of a bend extending in front of the vehicle seen in the direction of travel and to be driven through.

At the same time, the processor module 10 receives the data determined with the aid of the lane recognition algorithm from the images of the camera 30 on the course of the road extending in front of the vehicle seen in the direction of travel from the evaluation unit 40 of the determination module 20.

The road course data delivered from the navigation system 50 and from the determination module 20 are fused with one another in the processor module 10, which results in an improved estimation of a course of a bend and of the distance of the vehicle from the bend.

The processor module 10 calculates a maximum speed for the course of the bend estimated in this manner, in particular for the radius of the bend underlying this course of the bend, at which the vehicle can drive through the bend safely under ideal conditions, i.e. that is without being carried out of the bend or starting to slide, while taking account of the vehicle properties such as the mass and friction of the vehicle wheels and while applying the relevant basic physical laws, i.e. that is the vehicle dynamics.

A recommended maximum speed is determined in the processor module 10 from the maximum speed calculated for the ideal conditions while taking account of the other data named above, determined by the determination module 20 and delivered to the processor module 10, said recommended maximum speed not only taking account of the estimated course of the bend, but also of the detected conditions of the road, of the weather and of visibility conditions.

For example, the finding that it is night or is foggy or that the road is wet or sandy can thus have the result that the maximum speed calculated for the ideal conditions is corrected downwardly by a specific amount.

Furthermore, the recommended maximum speed can be reduced to the preset speed limit value on detection of a speed limit applicable to a bendy road such as can be determined by the road sign recognition algorithm.

The recommended maximum speed described in the above manner and determined in the processor module 10 is displayed to the driver of the vehicle by means of a suitable visual and/or acoustic output device 60.

Figure 2:
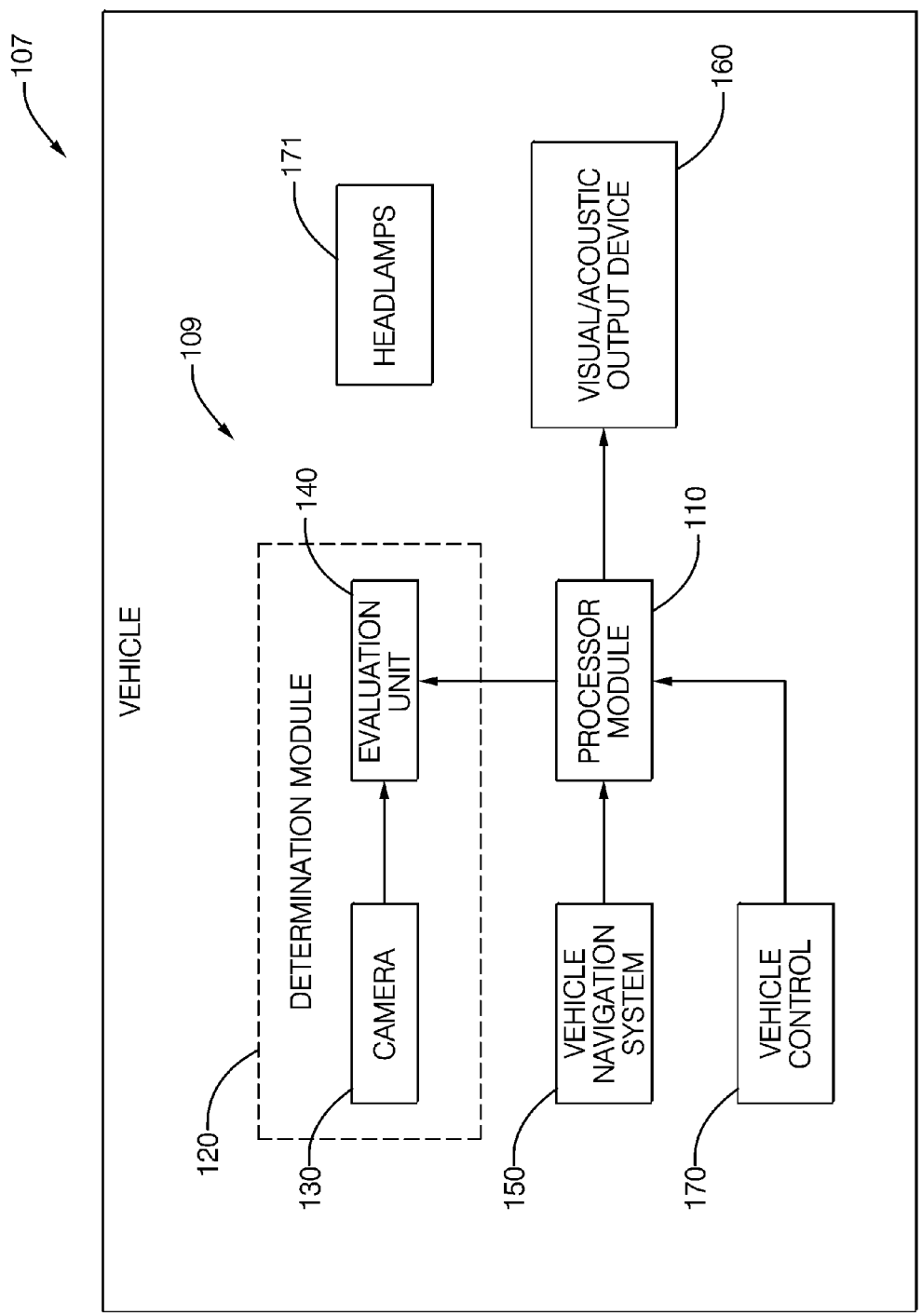
FIG. 2 shows a schematic representation of a driver assistance system of a vehicle in accordance with an alternate embodiment of the invention.

Referring to FIG. 2, alternately or additionally to the estimation of the visibility conditions by the evaluation of camera images, the visibility conditions prevailing in front of the vehicle seen in the direction of travel can also be estimated with reference to an automatic actuation of a headlamp 171 of vehicle 107. An automatic switching on of headlamp 171 can, for example, be evaluated as an indication of adverse visibility conditions, which can have the consequence of a reduction of the recommended maximum speed. Elements in FIG. 2 that are similar to elements shown in FIG. 1 have element numbers that differ by 100. Referring to FIG. 2, headlamps 171 and driver assistance system 109 are respectively disposed on vehicle 107.

As can be seen from FIG. 1, the processor module 10 is furthermore coupled to a vehicle control 70 by which the processor module 10 receives data with respect to the then current yaw rate and vehicle speed which can be determined with the help of sensors known per se.

The processor module 10 determines by a comparison of the determined recommended maximum speed with the yaw rate data and vehicle speed data received from the vehicle control 70 whether the vehicle is approaching the bend or is driving into it at a speed which is above the recommended maximum speed. If this is the case, the processor module 10 outputs a corresponding warning signal via the output device 60 to the driver of the vehicle to cause him to reduce the speed of the vehicle for the avoidance of an accident.

Alternatively or additionally, it is also conceivable that the processor module 10 intervenes in the vehicle control to avoid an accident and causes an automatic slowing down of the vehicle to the recommended maximum speed.

In the present embodiment, the processor module 10, the evaluation unit 40 of the determination module 20 and the vehicle control 70 are shown as separate units. It is, however, generally also possible to integrate the evaluation unit 40 into the processor module 10 or to integrate the evaluation unit 40 and the processor module 10 into the vehicle control 70.

Furthermore, the processor module 10 can be coupled with a receiver, not shown, which receives signals from outside the vehicle which include information on the conditions of the road, the weather and/or visibility conditions, for example from oncoming vehicles, from an infrastructure installed at the side of the road, via radio or via an internet service in order to use these data in addition to or instead of the data delivered by the determination module 20 for the determination of the recommended maximum speed.

We claim:

1. A method for assisting a driver of a vehicle by providing a driver assistance system that outputs a recommended maximum speed for a bend in a road prior to the vehicle traveling in the bend, comprising:
   determining bend data indicating a course of the bend in the road by the system;
   determining road condition data that indicates a condition of a road surface in front of the vehicle in a forward direction of travel by the system;
   analyzing the bend data and the road condition data by the system;
   determining a recommended maximum speed based on the analyzed bend data and the analyzed road condition data by the driver assistance system; and
   outputting the recommended maximum speed to the driver by the driver assistance system in advance of the vehicle entering the bend.

2. The method in accordance with claim 1, wherein the bend data is determined from a digital map available to the vehicle.

3. The method in accordance with claim 1, wherein the road condition data comprises information indicating a quality of the road surface.

4. The method in accordance with claim 1, wherein the road condition data comprises information indicating wetness of the road surface.

5. The method in accordance with claim 1, wherein the road condition data is received from a communication means located outside of the vehicle.

6. The method in accordance with claim 1, wherein the driver assistance system includes at least one camera and an image evaluation unit, and the step of determining the recommended maximum speed further includes,
   taking the at least one image of the environmental zone by the camera;
   detecting an environmental zone in the forward direction through at least one image taken by the at least one camera disposed on the vehicle, the environmental zone including at least one road sign that includes road sign content,
   determining the road sign content in the at least one image, and
   using the determined road sign content to assist in the determination of the recommended maximum speed.

7. The method in accordance with claim 6, wherein the environmental zone includes visibility conditions and the at least one image includes visibility condition content, and the step of determining the recommended maximum speed further includes,
   determining the at least one image for the visibility condition content,
   using the determined visibility condition content to assist in the determination of the recommended maximum speed.

8. The method in accordance with claim 7, wherein the step of determining that at least one image for the visibility condition content occurs when headlamps on the vehicle are actuated.

9. The method in accordance with claim 7, wherein that at least one camera comprises a single camera, the method further including,
   taking at least one image of the environmental zone with the single camera, and the bend data, the road condition data, the road sign content, and the visibility condition content are contained on the at least one image taken by the single camera.

10. The method in accordance with claim 1, wherein a warning signal is output to the driver by the processor when an actual speed of the vehicle in the bend exceeds the recommended maximum speed.

11. The method in accordance with claim 10, wherein the vehicle is automatically slowed down by the processor to the recommended maximum speed when the actual speed exceeds the recommended maximum speed.

12. A driver assistance system for assisting a driver of a vehicle by providing a recommended maximum speed to the driver for driving in a bend of a road prior to the vehicle traveling in the bend, comprising:
   a first module for determining bend data representing the direction of the bend of the road;
   a second module for determining road condition data representing a condition of a road surface in front of the vehicle; and
   a processor module in electrical communication with the first and second modules, said processor module analyzing the bend data and the road condition data to determine a recommended maximum speed for driving the vehicle in the bend, said recommended maximum speed being output from the processor module to the driver in advance of the vehicle entering the bend.

13. The method according to claim 1, wherein the system includes at least one camera, and additional bend data and the road condition data are contained in the at least one image taken by the camera, and the maximum recommended speed is a function of the bend data and the additional bend data.

14. The method according to claim 13, wherein the at least one camera is a single camera, and the single camera is disposed in a region of a rear view mirror of the vehicle adjacent a windshield of the vehicle.

15. The method according to claim 13, wherein the at least one camera is a single camera, and the single camera is a component of a rain sensor, and the rain sensor operatively controls a windshield wiper of the vehicle.

16. The method according to claim 4, wherein the wetness on the road is determined by a rain sensor that controls actuation of a windshield wiper of the vehicle.

17. The method according to claim 9, wherein the single camera is disposed in the vehicle in a region of a rear view minor adjacent a windshield of the vehicle.

18. The driver assistance system according to claim 12, wherein the second module further includes bend data, and the processor module receives and processes the bend data from the first module and the bend data from the second module to respectively assist in the determination of the recommended maximum speed.

* * * * *